United States Patent [19]

Suslin et al.

[11] 4,147,609
[45] Apr. 3, 1979

[54] APPARATUS FOR ELECTROCHEMICAL MACHINING OF METAL PARTS

[76] Inventors: Vladimir I. Suslin, ulitsa Frunze 17, kv. 46; Alexandr I. Dubovik, ulitsa Gvardeitsev Shironintsev, 63a, kv. 22; Boris A. Makeev, ulitsa Novgorodskaya, 6, kv. 29; Vitaly A. Pilipenko, ulitsa Vorobieva, 15/19, kv. 2; Zinovy A. Lekarev, ulitsa Trinklera, 20, kv. 71; Boris S. Kolyshkin, ulitsa Otokara Yarosha, 41, kv. 79, all of Kharkov, U.S.S.R.

[21] Appl. No.: 860,981

[22] Filed: Dec. 15, 1977

[30] Foreign Application Priority Data

Dec. 20, 1976 [SU] U.S.S.R. .............................. 2427253

[51] Int. Cl.² ........................................... B23P 1/04
[52] U.S. Cl. .............................. 204/224 M; 204/279
[58] Field of Search ........... 204/224 M, 224 R, 129.1, 204/129.5, 129.6, 297 R, 279

[56] References Cited

U.S. PATENT DOCUMENTS

| | | | |
|---|---|---|---|
| 3,223,610 | 12/1965 | Inoue | 204/224 M |
| 3,506,559 | 4/1970 | Bonga | 204/224 M |
| 3,668,105 | 6/1972 | Abt | 204/224 M X |
| 3,753,890 | 8/1973 | Köppern et al. | 204/224 M |

FOREIGN PATENT DOCUMENTS 47-1686  1/1972  Japan .............................. 204/224 M Primary Examiner—John H. Mack
Assistant Examiner—D. R. Valentine
Attorney, Agent, or Firm—Robert E. Burns; Emmanuel J. Lobato; Bruce L. Adams

[57] ABSTRACT

An apparatus for electrochemical machining of metal parts by pumping an electrolyte through a machining zone and by applying a potential across a part to be machined and an electrode-tool with the aid of bar-type electrodes enclosed in an envelope of an elastic dielectric material to protect contact surfaces of the bar-type electrodes against electrochemical erosion.

1 Claim, 2 Drawing Figures

APPARATUS FOR ELECTROCHEMICAL MACHINING OF METAL PARTS

FIELD OF APPLICATION

The invention relates to electrical machining methods, and, more particularly, to apparatus for electrochemical machining of metal parts, said apparatus comprising an electrode-tool which remains stationary in the course of machining.

1. BACKGROUND OF THE INVENTION

A known electrochemical machining machine tool is manufactured by the firm BOSCH in FRG and comprises a table with a base means for securing a part to be machined, an electrode-tool, bar-type electrodes for supplying current, a mechanism for feeding and draining working liquors (see a catalog "Maschinen und Anlagen für die Elektrochemische Metallbearbeitung" of the firm BOSCH).

An electric potential is applied to a part to be machined by a spring-loaded bar-type electrode. An electrolyte penetrates a zone of contact which is not a machining zone, and as current passes the bar-type electrode disintegrates through electrochemical erosion with the effect that said electrode is short-lived, its replacement involving additional both down time and consumption of electrodes.

SUMMARY OF THE INVENTION

It is an object of the invention to protect current-supply electrodes against electrochemical erosion.

This object is attained by providing an apparatus for electrochemical machining of metal parts by pumping an electrolyte through a machining zone and applying a potential across a part to be machined and an electrode-tool with the aid of bar-type electrodes, according to the invention, the bar-type electrode being enclosed in an envelope of an elastic dielectric material, said envelope extending beyond the contact surface of the bar-type electrode by a value δ.

The proposed technical solution prevents the penetration of working liquors (e.g., an electrolyte) into the zone of contact and thus eliminates an electrochemical erosion of electrodes therein with the effect that no disintegration thereof takes place.

BRIEF DESCRIPTION OF THE DRAWINGS

These and other objects and features of the invention become readily apparent from one embodiment thereof which will now be described by way of example with reference to the accompanying drawings, in which.

DESCRIPTION OF THE PREFERRED EMBODIMENT

Figure 1:
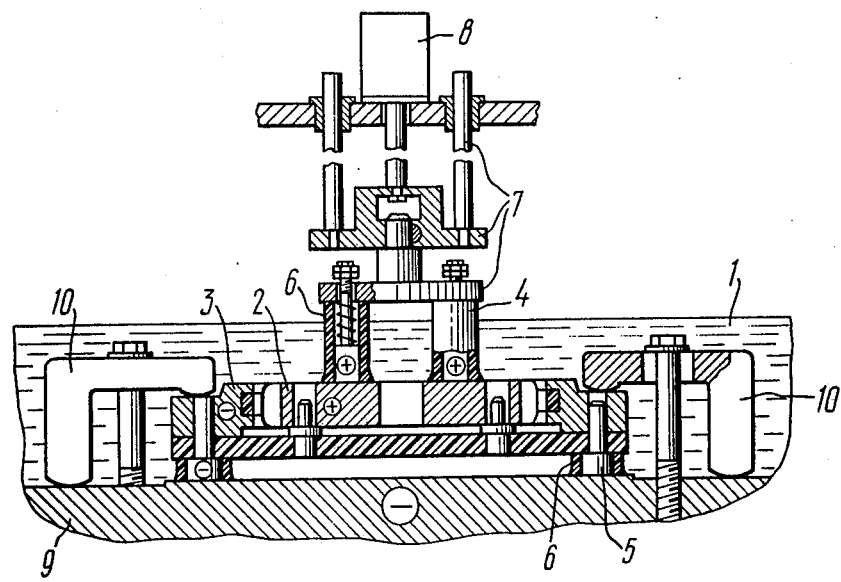
FIG. 1 is a schematic diagram of an apparatus for electrochemical machining of metal parts, according to the invention, with bar-type electrodes in the working position.

An apparatus for electrochemical machining of metal parts by pumping an electrolyte 1 (FIG. 1) through a machining zone and applying a potential across a part 2 to be machined and an electrode-tool 3 with the aid of bar-type electrodes 4 and 5. The electrode-tool 3 is also a base means for accommodating the part 2. The bar-type electrodes 4 and 5 are enclosed in an envelope 6 of an elastic dielectric material, the length of the envelope extends beyond the contact part of the bar-type electrode 4.

The bar-type electrodes 4 applying a positive potential to the part 2 are fixed to a mobile component part 7 of the apparatus together with an actuating means 8.

The bar-type electrodes 5 fixed to the electrode-tool 3 are forced against a table 9 having a negative potential with the aid of hold-down clamps 10.

Figure 2:
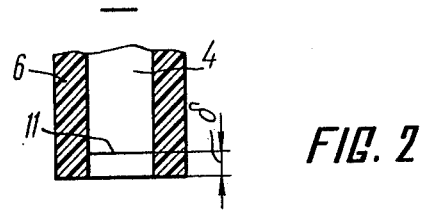
FIG. 2 is a schematic diagram of a bar-type electrode, in accordance with the invention, in a non-working position.

FIG. 2 illustrates a bar-type electrode 4 in a non-working position. The electrode 5 is of a similar design. The length of the envelope 6 extends beyond the contact part of the bar-type electrode 4 by a value δ sufficient to make tight a contact surface 11 when the bar-type electrode 4 is in the working position.

The electrode-tool 3 is forced against the table 9 by means of clamps 10, the bar-type electrode 5 being thus forced against the table 9 and a negative potential applied via the bar-type electrodes 5 against the electrode-tool 3. The envelope 6 forced against the table 9, contracts by a value δ and thus makes tight the contact surface 11.

To machine a part 2, it is mounted on the base means. The actuating means 8 lowers the mobile part 7 of the apparatus together with the bar-type electrodes 4 having a positive potential until said mobile part 7 comes into contact with the part 2 to apply a positive potential thereto. The electrolyte 1 is fed to the apparatus, and the electrochemical machining of the part 2 is thus initiated, the contact surfaces 11 being made reliably tight against penetration of the electrolyte 1 and so suffer no electrochemical erosion.

What is claimed is:

1. In an apparatus for electrochemical machining of metal parts comprising, an electrode-tool energized for electrochemical machining of a metal workpiece, bar-type electrodes having contact end surfaces for applying a potential across the workpiece to be machined and said electrode-tool, an elastic sleeve of a dielectric material for each bar-type electrode disposed over the corresponding bar-type electrode and having an axial portion extending axially beyond said contact surface, whereby when each said bar-type electrode is engaged with the contact surface thereof making contact with said workpiece for applying a potential thereto the axial portion of the sleeve is compressed and deformed to effect a fluidtight seal circumferentially of the corresponding contact surface and surface area of the workpiece contacted.

* * * * *